Jan. 11, 1955 H. ADAMSON 2,699,030
METHOD OF HARVESTING BROOM CORN AND THE LIKE
Filed Feb. 8, 1952 5 Sheets-Sheet 1
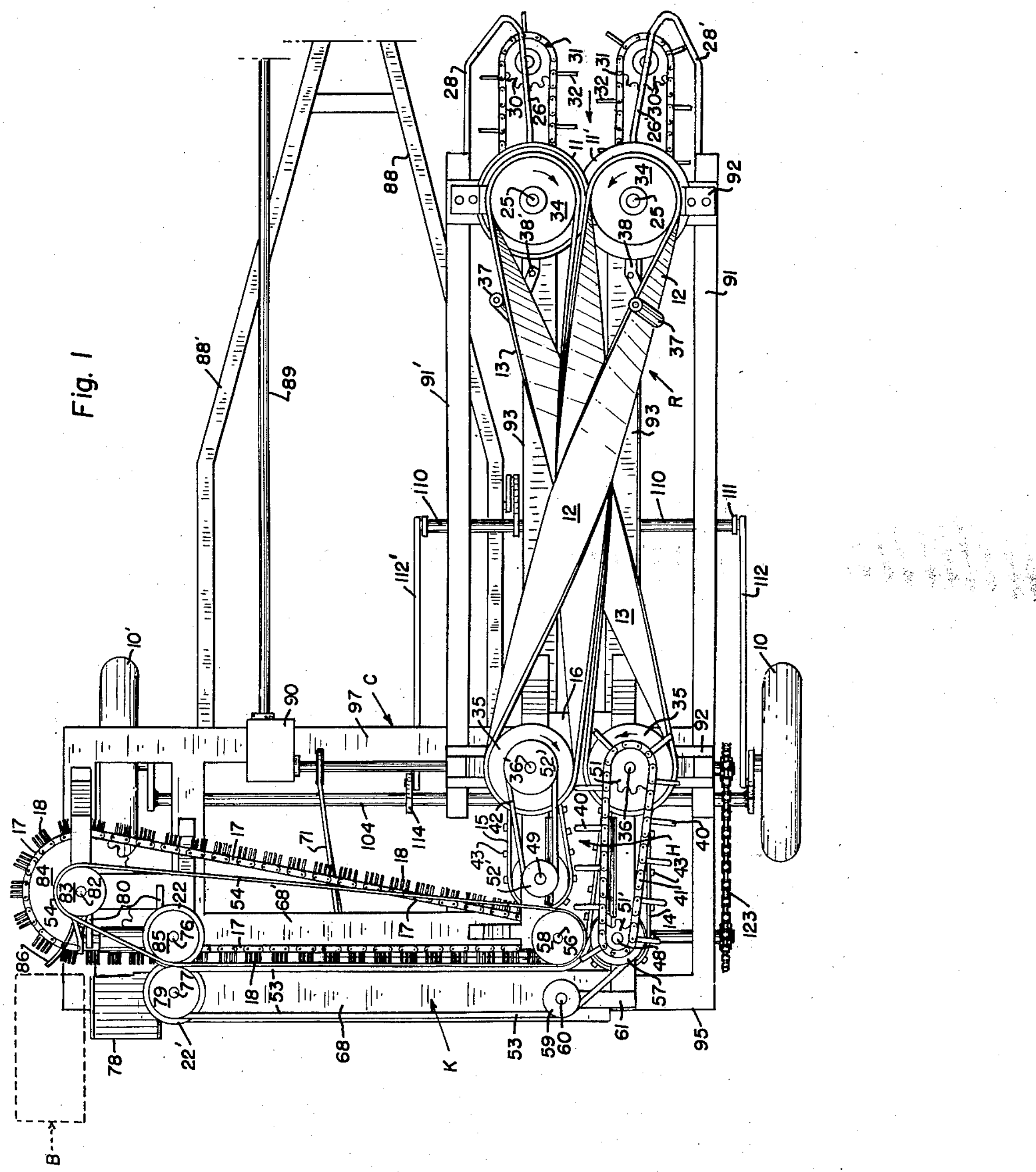
Inventor
HARVE ADAMSON
By Lamphere + Van Valkenburgh
Attorney METHOD OF HARVESTING BROOM CORN AND THE LIKE
Filed Feb. 8, 1952 5 Sheets-Sheet 2
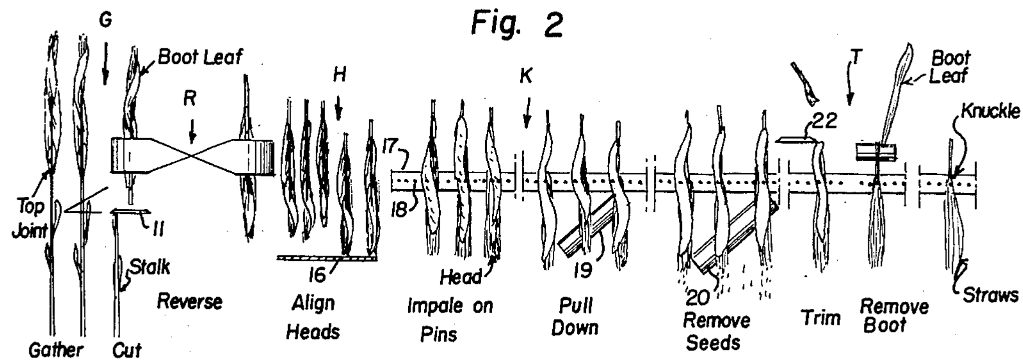
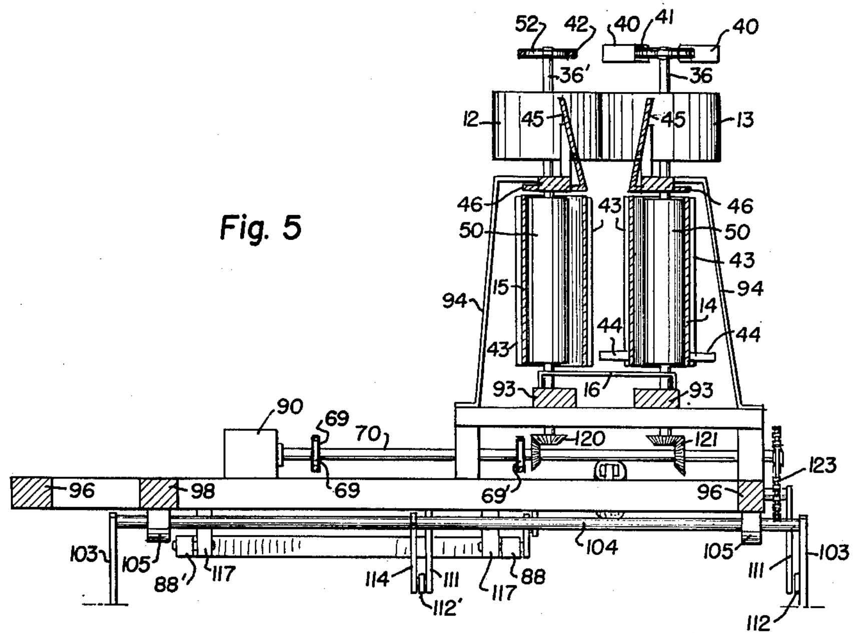
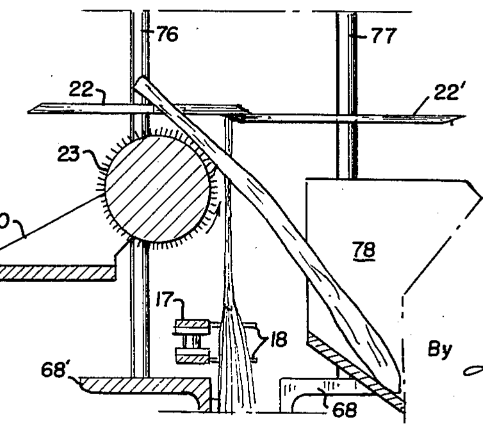
Inventor
HARVE ADAMSON
By Lamphere Van Valkenburgh
Attorneys METHOD OF HARVESTING BROOM CORN AND THE LIKE
Filed Feb. 8, 1952
5 Sheets-Sheet 3
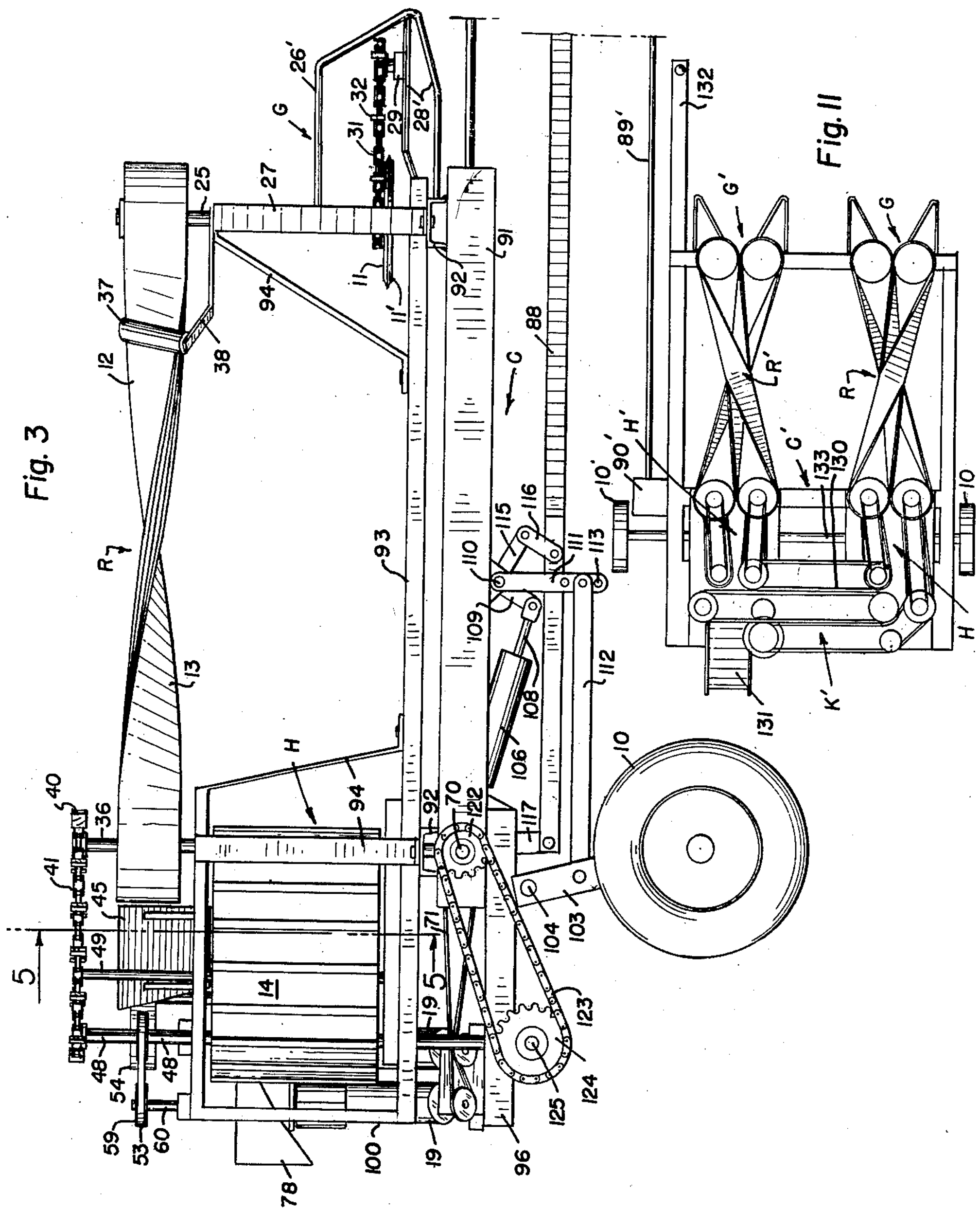
Inventor
HARVE ADAMSON
By Lamphere & Van Valkenburgh
Attorneys

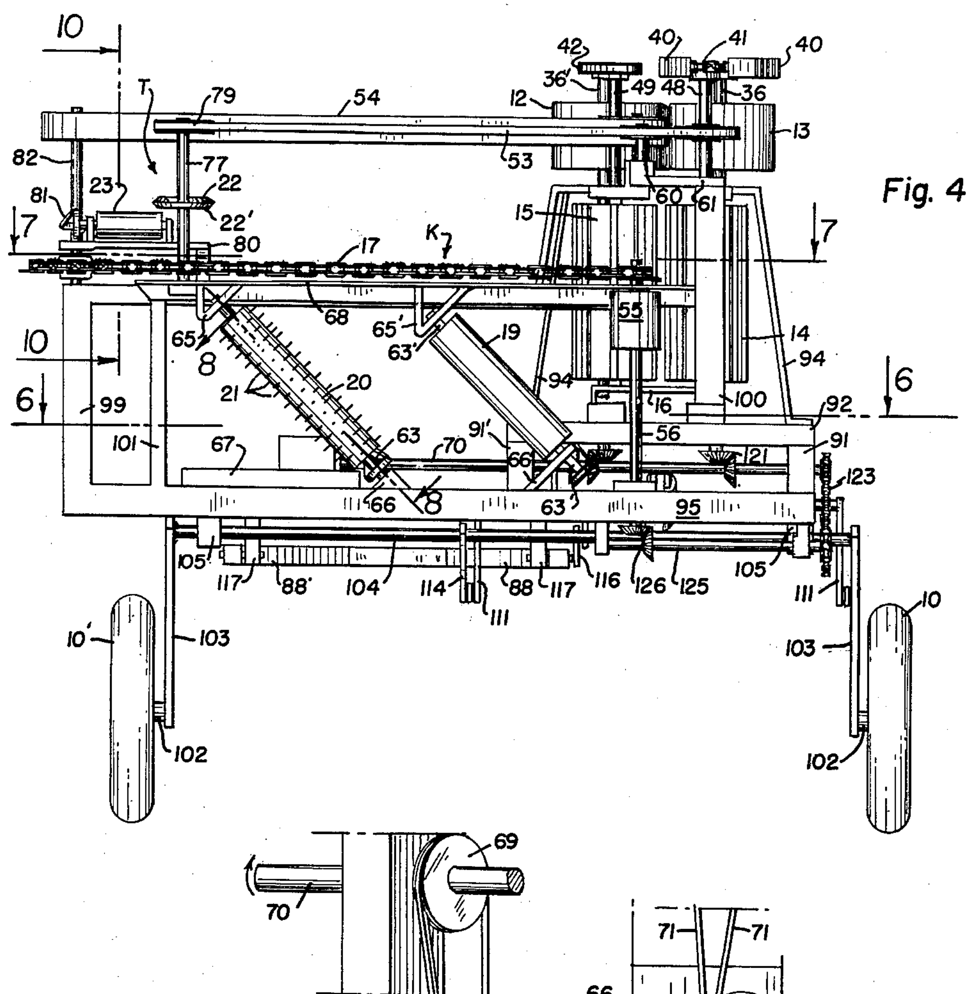
Fig. 4
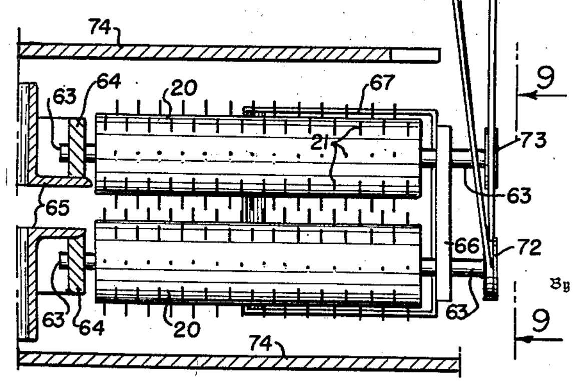
Fig. 8
71 71
66
73
63
63
72
66
Fig. 9
Inventor
HARVE ADAMSON
By Lamphere & VanValkenburgh
Attorneys METHOD OF HARVESTING BROOM CORN AND THE LIKE
Filed Feb. 8, 1952
Fig. 6
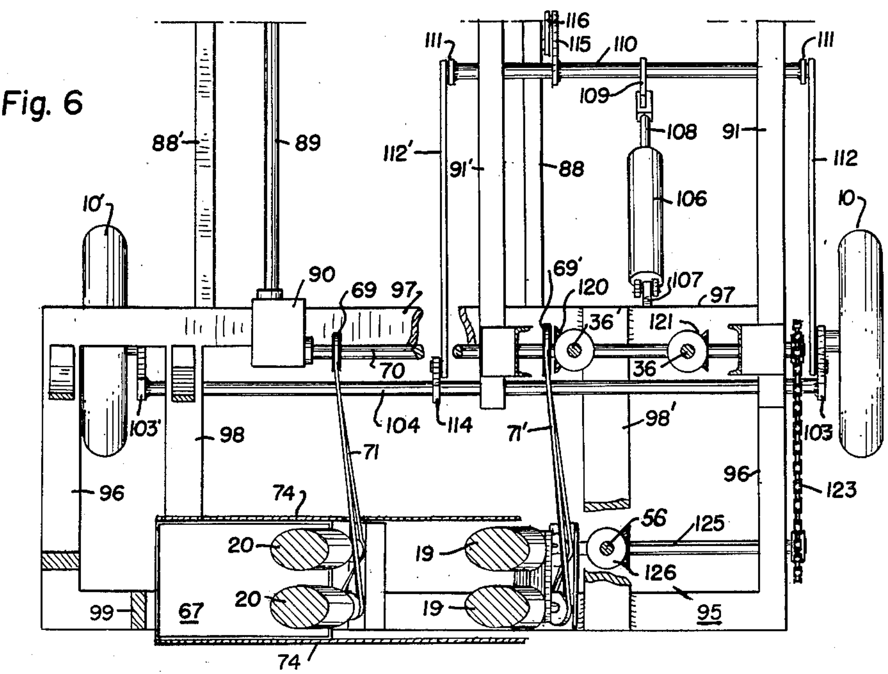
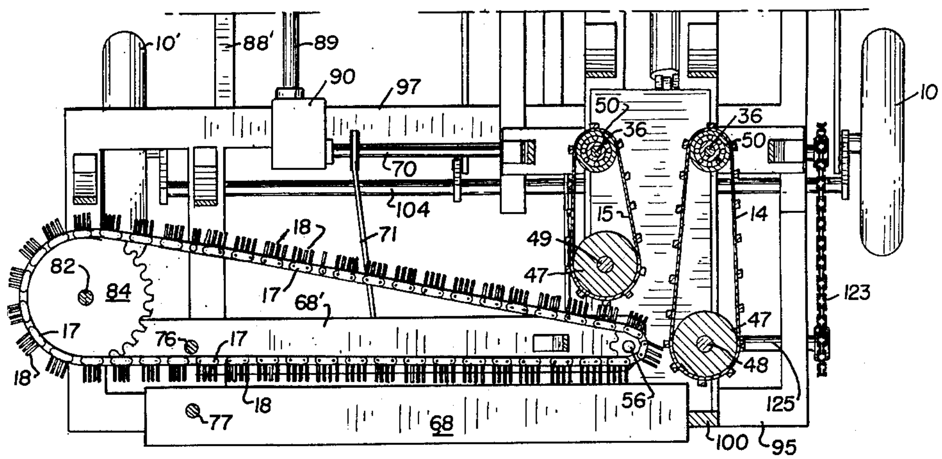
Fig. 7
Inventor
HARVE ADAMSON
By Lamphere & Van Valkenburgh
Attorneys

United States Patent Office 2,699,030

Patented Jan. 11, 1955

2,699,030

METHOD OF HARVESTING BROOM CORN AND THE LIKE

Harve Adamson, Holly, Colo., assignor of one-half to Roy Haney, Walsh, Colo.

Application February 8, 1952, Serial No. 270,693

6 Claims. (Cl. 56—54)

This invention relates to methods of harvesting broom corn and the like.

Broom corn is a plant somewhat on the nature of Indian corn or maize, but instead of having ears growing at different positions along the stalk, has a head at the upper end consisting of a series of straws, from which brooms may be made. In certain sections of the country, broom corn may grow to a height of six to eight feet and the heads may be approximately 18 inches to two feet in length. The heads, while on stalks in place in the ground, thus are at different elevations, depending on the height of the respective stalks. Surrounding the knuckle or points at which the straws emanate from the stalk, is a boot or leaf which extends upwardly from the stalk joint below the head and also wraps around the straws.

Broom corn must be harvested over a period of a few days, such as three or four days, when the corn is blooming, to obtain the best straws. It has customarily been the practice to harvest broom corn by hand, the heads being cut off just below the knuckle and the head pulled out of the boot. Then, a number of heads are assembled in a bundle, and the bundles are collected for curing in ricks. Needless to say, such hand operations are expensive, since a comparatively large labor force is required over a short period of time, but attempts to mechanize the harvesting of broom corn have not solved numerous difficult problems. If the broom corn is cut off at a constant height above the ground, the severed portions of the stalks, carrying the heads, are usually of unequal length, and the heads themselves usually vary considerably in length; the boot which surrounds the lower ends of the heads causes considerable difficulty; and the straws carry seeds, which must be removed before the straws are marketable. Heretofore, machines for removing the seeds have been developed, but such machines have involved the separate operation of feeding the heads thereto, after hand harvesting and removal of the boot.

Among the objects of the present invention are to provide an improved method of harvesting broom corn and the like; to provide such method which will sever the cut-off stalk portions at a desired point, such as adjacent the knuckle or junction between the head straws and the stalk; to provide such method which may effectively remove the boot; to provide such method which can also remove the seeds from the head; and to provide such method which will operate effectively and efficiently.

Additional objects and the novel features of this invention will become apparent from the description which follows, taken in connection with the accompanying drawings, in which:

Fig. 1 is a top plan view of one embodiment of apparatus for harvesting broom corn and the like, particularly adapted to carry out the method of this invention;

Fig. 2 is a diagram of the operational steps involved in the harvesting of broom corn by the method of this invention;

Fig. 3 is a side elevation of the apparatus of Fig. 1;

Fig. 4 is a rear elevation of the apparatus of Fig. 1 with parts broken away;

Fig. 5 is a partial vertical section, taken along line 5—5 of Fig. 3;

Fig. 6 is a partial horizontal section, taken along line 6—6 of Fig. 4;

Fig. 7 is a partial horizontal section, taken along line 7—7 of Fig. 4;

Fig. 8 is an enlarged partial oblique section, taken along line 8—8 of Fig. 4;

Fig. 9 is a fragmentary oblique view, looking upwardly from line 9—9 of Fig. 8;

Fig. 10 is a fragmentary vertical section taken along line 10—10 of Fig. 4, on an enlarged scale; and Fig. 11 is a top plan view, partly diagrammatic, illustrating a further embodiment of apparatus particularly adapted to carry out the method of this invention, adapted to harvest two rows simultaneously.

As illustrated in Figs. 1 and 3, apparatus adapted to carry out the method of this invention may include a carriage C, adapted to be drawn by a tractor or the like, the carriage being provided with wheels 10 and 10' which are mounted for adjustment of the vertical position of the parts mounted on the carriage, in a manner described later, to permit adjustment of the height at which the stalks are cut off. Mounted on the forward end of the carriage C is a gathering and cutting means G, adapted to force successive stalks into engagement with a cutting or stalk severing device, such as a pair of rotating cutting discs 11 and 11', as also indicated in the operation diagram of Fig. 2 which illustrates the method of this invention. In Fig. 2, the parts of a typical broom corn plant are also indicated, including the stalk, the boot leaf, the top joint at which the boot leaf emanates, the head of straws, and the knuckle at which the straws grow from the stalk.

After cutting, the severed stalk portions are moved away and reversed in direction so that the terminal ends of the heads point downwardly. Thus, the severed stalk portions may be received by a stalk reversing means R, which preferably comprises essentially a pair of comparatively wide and relatively long twisted belts 12 and 13, adapted to invert the severed portion of the stalk so that instead of being upright, as when it entered the reversing means, the head points generally downwardly when it leaves the reversing means.

After being turned upside down, the severed stalk portions are aligned at their terminal ends along a generally common line while the heads remain pointed downwardly. Thus, from the twisting belts 12 and 13, the severed stalk portions are delivered to a head alignment means H, which includes a pair of canvas belts 14 and 15 between which the severed stalk portions move and which permit the stalks to move down by gravity until the ends of each head engages a plate 16, shown also in Fig. 4.

After the heads have been aligned (in upside down position, of course) they are aligned at the knuckles, as by moving a plurality of teeth along a generally common line to engage the downwardly pointed heads at the straws, and the heads are pulled in a direction transverse to the direction of movement of the teeth, preferably downwardly. The seeds may also be removed as the heads are pulled downwardly. Thus, the heads may be delivered to a knuckle alignment means K, such as including essentially a horizontally moving chain 17 having a series of teeth 18 extending laterally therefrom, the teeth 18 engaging the straws below the knuckle, (the head being upside down) and the heads being pulled down onto the teeth 18, as by a pair of rolls 19. In addition, the seeds may be removed by a pair of seeder rolls 20 provided with laterally projecting spikes or teeth 21. Furthermore, as the heads are pulled down onto the teeth 18, the teeth tend to push the boot leaf along the head, thus loosening the boot leaf.

After the heads are aligned at the knuckles, they are cut off at a point just above the point of alignment, and the boot leaf brushed away, if desired, or the remainder of the boot leaf may be left to dry on the heads so that it will later fall off. In the apparatus, with the heads pulled down onto the chain teeth 18, the severed stalk portions, still upside down, next encounter a trimming and boot removing means T, which may include a pair of rotating cutting discs 22 and 22' which sever the stalk just above the knuckle or point of emanation of the straws from the stalk (the head being still upside down). The severed stalk portion falls off, having been cut off above the chain 17, while the loosened remainder of the boot leaf may be engaged by a pair of wire brush rolls 23 (only one of which is shown) which pull the boot leaf from the head, the latter still being impaled on the teeth 18. The trimmed and booted heads may then be delivered to a binding mechanism B, which is illustrated only diagrammatically in Fig. 1, since it may be conventional in character and similar to well-known and conventional mechanisms. Of course, if desired, the binding mechanism may not be used, the heads being merely delivered to a barge or the like, for transportation to curing ricks or elsewhere, as desired.

As will be evident, the reversing means R, including the twisted belts 12 and 13, place the severed stalk portions in upside down position, thus obviating any difficulty caused by variation in the height to which various stalks have grown and the elevation with respect to the ground of the heads thereon. Thus, it is necessary only to cut the growing stalks at an elevation above the ground so that the upper end of a stalk will be above the belts 12 and 13 as it enters between them. Preferably, the stalks are cut so that the lowest heads will be above the belts 12 and 13 as the stalk enters between them, but the cut-off point may be higher, if desired, since heads may pass between the belts without undue damage. Thus, the elevation of the carriage C need not be adjusted for each stalk, but only generally for variation in broom corn height. As a result, difficulties due to variations in the height to which various stalks grow have been overcome.

The stalk reversing means R also places the severed stalk portions in position to be operated upon by the head alignment means H, which insures that the former upper end of each head will be at the same level when the knuckle alignment means K is engaged. Since the heads are pulled down to the same point for each head, i. e. with the straws pulled down substantially to the knuckle against the teeth 18 of chain 17, it will be evident that the head alignment means H, in conjunction with the knuckle alignment means K, overcomes previous difficulties caused by variations in head or straw length. Furthermore, the seeder rolls 20 perform a dual function, i. e. they both pull the head down against the chain teeth 18 and also remove the seeds. The positioning of the heads, upside down and with the straws pulled down against the chain teeth, cause the severed stalk portions to be presented to the boot trimming cutting discs 22 and 22' at substantially the same point for each stalk or head, so that not only may the excess length of stalk be cut off, but also the boot leaf may be severed at a point formerly above its attachment to the stalk. After the attachment of the boot leaf to the stalk has been severed, the remainder of the boot leaf may readily be removed by the wire brush rolls 23. Thus, previous costly hand operations, for removal of the boot leaf, have been eliminated.

The parts preferably constituting the various means described above will now be described in detail.

*The gathering and cutting means G*

The gathering and cutting means G includes the cutting disks 11 and 11', as indicated previously, these cutting disks being mounted on vertical shafts 25 and conveniently having tapered edges with the bevel of upper disc 11 sloping downwardly and the bevel of lower disc 11' sloping upwardly. Ahead of the cutting discs 11 and 11', is a stalk guiding framework on each side of the row, each framework being a mirror image of the other and including an upper bar 26 or 26' which extends forwardly from a bracket 27, then downwardly to a point of connection with the front end of a V-shaped lower bar 28 or 28', each leg of which extends at a different level rearwardly to the carriage C. An upwardly extending bracket 29 is mounted on the inside leg of each lower bar 28 and 28', to provide a support for a sprocket 30 which is encircled by a chain 31, the latter also passing around sprockets mounted on shafts 25 above cutting discs 11 and 11' and through which sprockets the chains 31 may conveniently be driven by the shafts 25. Chains 31 are preferably provided with paddles 32 at spaced positions therealong, such as at alternate chain links, so as to move the broom corn into and hold the stalks against the cutting disks 11 and 11'.

*The stalk reversing means R*

As illustrated in Figs. 1 and 3, the stalk reversing means includes the previously mentioned pair of belts 12 and 13, each of which encircles a front pulley 34 mounted at the upper end of a shaft 25 and a rear pulley 35 mounted on a shaft 36 or 36'. The belts 12 and 13 are twisted about each other, the inner run of each belt turning through 180°, so that a stalk held by the belts will be turned upside down by the time the belts reach the rear pulleys 35, as described previously. As will be evident from Fig. 1, the belt 12 encircles the right front pulley 34 and the left rear pulley 35, while the belt 13 encircles the left front pulley 34 and the right rear pulley 35, and the pulleys 34 and 35 turn in the directions indicated by the arrows of Fig. 1. Since the stalks are held between the inside runs of the belts, the belts are preferably driven from the rear, i. e. from shafts 36 and 36', on which the rear pulleys 35 are mounted, the belts 12 and 13 thus conveniently driving the front pulleys 34, and through them the shafts 25 and cutting discs 11 and 11' and sprockets for chains 31 mounted thereon. If there appears to be any tendency for the belts to run off the front pulleys 34, they may be held more firmly thereon by auxiliary rollers 37, mounted on respective brackets 38 and 38', the rollers 37 being preferably tipped to the desired angle of the belts at the point of engagement. In many instances, of course, the auxiliary rollers 37 may be omitted, particularly if the width of the belts is such that, compared to the diameter of the pulleys 34, less tendency for upward or downward creep occurs, as when the belts are 12 in. wide, 16 ft. long, and the pulleys are about 12 in. in diameter.

*The head alignment means H*

As the severed stalks, now upside down, leave the twisting belts 12 and 13, they are permitted to slide downwardly until the points, or former upper ends, of the heads are aligned at a substantially common level on the floor plate 16, disposed beneath the canvas belts 14 and 15. The stalks are engaged by paddles 40 on spaced links of a chain 41, which moves in synchronism with the belt 14 and slightly above the position of twisting belts 12 and 13, while the stalks are urged toward the paddles 40 by a smooth belt 42, as in Fig. 5, which may be disposed at approximately the same level. Belts 14 and 15 may be provided with slats 43, for moving the heads along the floor plate 16, while belt 14 may be provided with paddles 44 at spaced points along its lower edge, as in Figs. 3 and 5. Also, belts 14 and 15, as in Fig. 7, may be spaced slightly further apart at their front ends than at their rear ends to permit the heads to slide more readily downward at the front and to maintain them more accurately in line at the rear. Thus, in one installation, the belts 14 and 15 are spaced apart about 8 in. at the front, about 6 in. at the center and about 4 in. at the rear, the belts being about 12 to 18 inches wide. In addition, in order to prevent leaves and the like from interfering with downward movement of the heads, a hopper may be provided, consisting of inclined strips 45, placed one on each side and converging inwardly from a point just beneath the inside run of paddle chain 41 and smooth belt 42, respectively, to the edges of plates 46 placed horizontally just above each belt 14 and 15. The hopper strips 45 and plates 46 are conveniently made of sheet metal, although other materials may be utilized, if desired, while stub 45 and plate 46 on each side may be integral. The hopper strips 45 are preferably inclined at a sufficiently sharp angle, such as 60° to 75° to the horizontal, to permit the heads to move downwardly sufficiently quickly so that the end of a head will reach plate 16 by the time the ends of belts 14 and 15 are reached.

Belts 14 and 15 may be driven by pulleys 47, at the rear, which are mounted on respective shafts 48 and 49, while at their front ends, the belts 14 and 15 move around bearing pulleys 50, preferably rotatable freely about shafts 36 and 36', as in Fig. 7, since different speeds for the aligning belts 14 and 15 and the twisting belts 12 and 13 may be desired. The belt 14 may also be longer than the belt 15, so as to assist in moving the heads directly into the chain 17, as will be evident from Fig. 7. The paddle chain 41 may move about sockets 51 and 51', as in Fig. 1, while smooth belt 42 may move about pulleys 52 and 52'. Sprocket 51 and pulley 52 may be mounted on shafts 36 and 36', respectively, sprocket 51' on shaft 48 and pulley 52' on shaft 49.

From the end of belt 14, the heads may be guided around to the toothed chain 17, as by upper cooperating belts 53 and 54, and a lower guide roll 55, the latter being mounted on a vertical shaft 56 rearwardly of the inside head alignment belt 15, and adapted to move the heads around from the longer belt 14 and impart a lateral motion thereto, the stalks of course also having a lateral motion imparted to them by the guide belts 53 and 54, so that the heads will engage the chain teeth 18 at points substantially beneath the points at which the stalks are held between the guide belts 53 and 54. As in Figs. 1 and 4, the rear guide belt 53 may pass around a pulley 57, mounted on vertical shaft 48, while the front guide belt 54 may pass around a pulley 58 which is mounted on shaft 56 (broken away above roll 55 in Fig. 4 for clarity of illustration). The inside run of belt 53 follows against the belt 54, so as to hold the stalks therebetween, while the outside run of belt 54 may be held out at the rear by an auxiliary pulley 59 mounted on a stub shaft 60, in turn mounted on a bracket 61.

*The knuckle alignment means K*

As will be evident, as the heads pass around the guide roll 55, with the stalks held between the guide belts 53 and 54, the straws will engage teeth 18 on chain 17, and the joint or base of the former uppermost leaf or boot leaf will be above the teeth 18. Thus, the chain 17 is preferably disposed at an elevation above the floor plate 16 of the head alignment means H a distance less than the length of straws of the shortest head to be encountered. As will be noted from Fig. 4, the floor plate 16 may be spaced well toward the center, in a vertical direction, of the knuckle alignment means K, so as to accommodate various lengths of heads. As described previously in connection with Fig. 2, the straws are first pulled down onto the chain teeth 18 by pull down rolls 19, and the seeds are then removed by the seeder rolls 20, through the action of the spikes or teeth 21. The pull down rolls 19 may be comparatively smooth, or slightly rough, if desired, and are rotated inwardly toward each other, as are also the seeder rolls 20, as in the direction of the arrows of Fig. 8. The rolls 20 are conveniently mounted on shafts 63, journaled at their upper ends in suitable bearings 64 mounted on a bracket 65 and at their lower ends in suitable bearings (not shown) mounted on a bracket 66, as shown in Fig. 8. In addition, a hopper 67 for collecting seeds may be disposed beneath the seeder rolls 20. The pull down rolls 19, which may be the same length as or shorter than the seeder rolls 20, if desired, may be similarly mounted, as on shafts 63' rotating in bearings mounted on brackets 65' and 66'. Brackets 65 and 65' may be mounted on plates 68 and 68', shown in Figs. 1 and 4.

The axis of rotation of both the pull down rolls 19 and the seeder rolls 20 may be disposed at a suitable angle, such as 45°, since that angle has been found to be quite effective, although other angles of inclination may be utilized for either. Both the pull down rolls 19 and the seeder rolls 20 may be driven in a similar manner, and for this reason only the drive to the seeder rolls 20 is illustrated in greater detail in Figs. 8 and 9, it being understood that the seeder rolls 20 may be driven at a greater speed, such as from 1000 to 1200 R. P. M., whereas the pull down rolls 19 may be driven at a lesser speed, such as from 500 to 750 R. P. M. Therefore, the various pulleys in the drive to the seeder rolls may differ in size from those in the pull down roll drive. The former may include a drive pulley 69 mounted on a generally horizontal, transversely extending shaft 70, pulley 69 being adapted to engage a V-belt 71 which drives with its V-side a pulley 72 on the lower end of the shaft 63 for the rear seeder roll 20. Since the rolls 20 are driven in opposite directions, the flat side of V-belt 71 may engage the top of a pulley 73, mounted on the lower end of the shaft 63 for the forward seeder rolls 20, the pulleys 72 and 73 thus being driven in the direction of the arrows of Fig. 9. In addition, the pulleys 73 may also be provided with a flat groove, to insure alignment of the belt as it passes over the pulley. It will be evident of course that the pulleys 72 and 73 rotate about axes disposed at 45° to the axis of rotation of drive pulley 69, and the top edge of pulley 73 is therefore preferably disposed in vertical alignment with the lower edge of drive pulleys 69, so that the belt 71 will pass in a straight line, although being twisted to a 45° angle in the process, from the pulley 69 to the pulley 73. Although the belt 71 will also move to the side, as well as being twisted to a 45° angle, in passing from pulley 72 back to drive pulley 69, since the pull is in the direction of the arrow of Fig. 8, there will be no tendency for the belt to slip off pulley 72, since the belt need not twist until it leaves the pulley 72, and the grooves in pulleys 72 and 69 will also assist in maintaining the belt in engagement with the pulleys. For driving the seeder rolls 20 the drive pulley 69 may be substantially twice the diameter of pulleys 72 and 73, whereas for driving the pull down rolls 19, the corresponding drive pulley 69' on shaft 70 (see Fig. 6) may be substantially the same diameter as the pulleys on shafts 63'. The drive pulley 69 for the seeder rolls 20 and the corresponding drive pulley 69' for the pull down rolls 19, may also be variable in size, so that a desired variation in speed of these rolls may be obtained.

As also illustrated in Fig. 8, the spikes or teeth 21 mounted on the seeder rolls 20 may be spaced in longitudinal rows, or such rows may extend angularly around the cylinder, and the rows may have substantially the same spacing apart as the individual teeth in each row, such as about two to four inches for a six to twelve inch diameter roll. Also, the teeth may be approximately one to one and one-half inches long, and the rolls spaced apart a corresponding distance, so that there will be a clearance between the ends of the teeth as the rolls turn. Also, the teeth on one roll may be spaced from the end of the respective roll a different distance than the teeth on the other roll. Due to the comparatively hight speed of rotation of the seeder rolls 20, the teeth 21 tend to remove effectively the seeds from the heads and the removed seeds will fall, as into bin or hopper 67 provided for the purpose beneath the rolls. It is also preferably desired to enclose the rollers 20, as by plates 74, omitted in Fig. 4 to permit greater clarity of illustration, but shown in section in Figs. 6 and 8.

*The trimming and boot removing means T*

As described previously, as the heads carried by the teeth 18 of chain 17 are pulled down on the teeth 18, the stalks being simultaneously held between the guide belts 53 and 54, after the heads have passed the seeder rolls 20, they will have been pulled down onto the teeth 18 to the knuckle. This permits the shanks to be cut off at substantially the same distance above the knuckle for each head, and at a point between the knuckle and the former top joint, thereby severing the attachment of the boot leaf to the stalk, although a portion of the boot leaf may remain wrapped around the stalk but more likely rather loosely, in view of the tendency of the boot leaf to be pushed up along the stalk as the head is pulled down onto the teeth 18. In any event, after the heads leave the seeder rolls 20, they encounter the cutting discs 22 and 22', which may have tapered edges with the bevels facing away from each other, as shown, disc 22 being conveniently mounted on a short shaft 76 and disc 22' on a shaft 77, as in Figs. 4 and 10. The unnecessary portion of the stalk cut off by the discs may be allowed to fall to the rear onto the field, as down a chute 78, shown in Figs. 1, 3 and 10 but omitted in Fig. 4 for clarity of illustration of other parts. Also, the rear guide belt 54 preferably terminates at a pulley 79 on shaft 77, to permit the severed stalk portion to fall rearwardly. It will be understood, that for ease of handling, a small portion of the stalk is left with the straws, so that a head of straws may be handled as a unit. While a portion of the boot leaf will still tend to encircle, or partly encircle, the head at the boot end, this remainder of the boot leaf may be removed by the wire brush roll or rolls 23 disposed laterally adjacent the cutting discs 22, but slightly below the cutting level thereof. When two wire brush rolls 23 are utilized, they are disposed on opposite sides of the stalk end of the head and are rotated in opposite directions, upwardly on the inside, the inner roll 23 being rotated in the direction of the arrow of Fig. 10 when only one brush roll is utilized, so that the boot leaf will be pulled off the head and discharged upwardly, the boots thereby tending to move through the air to the rear, and to fall into the field, as by sliding down chute 78. The wire brush roll 23 may be mounted for rotation on a bracket 80 and driven by a twisted V-belt 81 from a shaft 82, on the upper end of which is mounted a pulley 83 for the far end of front guide belt 54, and below the same a sprocket 84 for chain 17. The guide belt 54 may also pass partly around a pulley 85 on shaft 76 opposite pulley 79 for guide belt 53, to maintain the belts 53 and 54 close together.

As the seeded heads pass toward the end of traverse of chain 17, the heads may be forced off the pins 18, as by an arm 86 which is disposed above the chain 17 and extends rearwardly and across the same. The arm 86 may be a spring, as shown, or may be a solid arm, pivoted at its inner end and provided with a spring tending to force it rearwardly. In any event, the heads are forced off the pins 18 by the arm 86, or in any other suitable manner and may be delivered to the binding mechanism B, indicated in dotted lines in Fig. 1. Or, the heads may merely be delivered to a conveyor for removal to a wagon, truck, rack or the like.

*Construction of carriage C*

The carriage C may include a truss or beam structure including side rails 88 and 88' which may be provided at their forward ends with a suitable hitch, such as a hook, ring or clevis pin, for attachment to a tractor or the like, adapted to draw the machine along a field. Preferably, the moving parts are power driven, such as through a shaft 89, connected at its forward end with the power drive connection of the tractor and extending at its rear end into a transmission or gear box 90. The specific manner in which certain of the moving parts are driven from the gear box 90, as through shaft 69, has been described, and others will be described hereinafter.

The gathering and cutting means G, stalk reversing means R and head alignment means H may be mounted on a pair of longitudinally extending beams 91 and 91', through cross beams 92, brace beams 93 and brackets 27 and 94, as in Figs. 1, 3 and 6. The knuckle alignment means K may be mounted on a cross beam 95 at the rear of the machine and attached by longitudinal beams 96 to the underside of beams 91 and 91', as in Figs. 4 and 6. An additional laterally extending beam 97 may also connect the forward ends of beams 96, and the beams 95 and 97 may be additionally connected by short longitudinal beams 98 and 98'. The various shaft bearings and other parts may be maintained in position by braces, supports and the like, such as posts 99, 100 and 101, shown in Figs. 4 and 7. The specific construction of the framework of the carriage may, of course, be varied considerably.

The carriage C may be mounted for movement along the field, as indicated previously, on a pair of wheels 10 and 10', which may be rubber-tired and mounted for rotation on a relatively short shaft 102, as in Fig. 4. Shafts 102 may in turn be mounted on the ends of arms 103, attached to the ends of an axle 104 mounted in bearings 105 on the underside of beams 96 and 98, the axle 104 being turned to move the arms 103 to different angular positions, and thereby adjust the height of the carriage with respect to the ground, i. e. in accordance with the height at which the broom corn stalks are to be cut off. For adjustment purposes, a hydraulic cylinder 106 may be pivotally connected at its rear end to a bracket 107 mounted on the lateral beam 97, as shown in Fig. 6, the piston rod 108 of the cylinder 106 being pivotally connected at its lower end to an arm 109 attached to a shaft 110, journalled in bearings on the underside of beams 91 and 91'. As in Figs. 1 and 6, each outer end of shaft 110 carries a lever 111 which extends downwardly and to the lower end of each the front end of a link 112 or 112' may be attached at different positions, as by a pin adjusted to one of holes 113 in a lever 111. The rear end of link 112 is pivotally attached to a wheel arm 103, while the rear end of link 112' is pivotally attached to an arm 114, in turn fixed to axle 104 in substantially parallel relation to wheel arms 103, as in Fig. 6. As a result, when levers 111 and shaft 110 pivot, the wheel arms 103 and axle 104 will pivot correspondingly, and the inclination of wheel arms 103 and the resultant position of the carriage C above the ground will be adjusted by inward or outward movement of rod 108 of hydraulic cylinder 106. The hydraulic fluid, for actuating hydraulic cylinder 106, may be supplied thereto from the tractor, as by a suitable hydraulic line, but which will be understood to extend to the tractor in a conventional manner, for control by the operator of the tractor.

To maintain the principal parts of the carriage in substantially horizontal position, i. e. parallel to the ground, a leveling and supporting linkage may also be provided, which may comprise, as in Figs. 3 and 6, a lever 115 fixed on shaft 110, and a link 116 pivotally connected between arm 115 and side rail 88. In addition, the side rails 88 and 88' are pivotally attached at their rear ends to blocks 117, extending downwardly from the lateral beam 97. As will be evident, when the hydraulic cylinder 106 is actuated to cause the wheel arms 103 to pivot, at the same time pivoting of shaft 110 and movement of arm 114 and link 115 will maintain the machine in substantially horizontal position. That is, as the carriage framework, as represented by longitudinal beams 91, 91' and 96, is moved upwardly or downwardly at axle 104, side rails 88 and 88' will tend to pivot at blocks 117 but the same pivotal movement of shaft 110 will increase or decrease the vertical spacing between rail 88 and beams 91 and 91', as will be evident from Fig. 3, an amount which is proportional to the movement of arms 103. In other words, when the arms 103 are pivoted to raise the carriage, the arm 115 and link 116 will increase the vertical spacing between rail 88 and beam 91, while when the arms 103 are pivoted to lower the carriage, the arm 115 and link 116 will decrease the vertical spacing between rail 88 and beam 91. It will be understood, of course, that it is considered that the front of rails 88 and 88' are at a fixed elevation by virtue of attachment to a tractor or the like. Also, the various arms, links and levers should be sufficiently strong to sustain the weight of the carriage and parts mounted thereon.

As indicated previously, the drive shaft 89 leads to a gear box 90 from which auxiliary drive shaft 70 extends transversely of the machine, and the pulleys 69 and 69' for the seeder rolls and pull down rolls are mounted on the latter. In addition, as in Fig. 6, shaft 36 and 36' may be driven from shaft 70 by spaced pairs of bevel gears 120 and 121, for driving the cutting and gathering means G and the stalk reversing means R. The shaft 48 for alignment belt 14 and guide belt 53 may be driven from the shaft 36 by the chain 41, while the shaft 49 for alignment belt 15 may be driven from shaft 36' by V-belt 42, as will be evident from Fig. 1, and shaft 77 for trimming disc 22' may be driven through belt 53. As in Figs. 1, 3 and 6, the end of shaft 70, opposite gear box 90, may be provided with a sprocket 122 which drives, through a chain 123, a sprocket 124 on a counter shaft 125. In turn, as in Figs. 4 and 6, counter shaft 125 drives shaft 56 for the chain 17 and guide belt 54 through bevel gears 126, while chain 17 may drive shaft 82 to drive the wire brush roll 23 and belt 54 may drive shaft 76 for trimming disc 22, as will again be evident from Fig. 1.

It will be noted that the apparatus of Figs. 1–3 is adapted to be moved down a single row of broom corn, but if desired, as illustrated diagrammatically in Fig. 11, the apparatus may be constructed so that two rows may be harvested simultaneously. In the apparatus of Fig. 11, the gathering and cutting means G, the reversing means R and the head alignment means H may be similar to the corresponding parts of the apparatus of Figs. 1–3. However, a second gathering means G', a second reversing means R' and a second head alignment means H' may be installed, similar to the corresponding parts for the first row, and in position to be moved down a second row, the space between the means G and G' corresponding to the distance between rows, such as 40 inches. The knuckle alignment means K' may be similar to the corresponding means of Figs. 1–3, but the toothed chain to which the heads are delivered from head alignment means H also receives heads from head alignment means H', the latter delivering the heads to the toothed chain at a point on its back traverse, the heads being held thereon by a belt 30, which may be disposed just above the belts of the head alignment means H and H' and move around pulleys mounted on the respective shafts for belt 14 of head alignment means H' and belt 15 of head alignment means H. As the heads travel around with the chain, they will encounter pull down rolls and seeder rolls, which are not shown in Fig. 11 but may be installed and constructed in the manner illustrated in the apparatus of Figs. 1–3. Similarly, the severed stalk portions, upside down as before, engage boot trimming and removing means which may be constructed in the manner of the corresponding means of Figs. 1–3, and the seeded, trimmed and booted heads may be discharged to a binding mechanism, as before, or to a conveyor 131 for delivery to a wagon, rack or the like. The carriage C' of Fig. 11 may be comparatively wider than the carriage C of Fig. 1, and may be connected to a tractor or the like by a beam 132, the front end of which may be raised or lowered at the tractor to adjust the elevation at which the cutting discs of the gathering and cutting means G and G' will engage the stalks. The drive shaft 89' and gear box 90' may be mounted on the far side of beam 132, while a fixed axle 133 may be provided for wheels 10 and 10'. It will be understood that carriage C of Fig. 1 may be similarly constructed.

It will also be understood that, although different embodiments of apparatus adapted to carry out the method of this invention have been described and variations therein indicated, other embodiments may exist and other variations in construction may be utilized.

What is claimed is:

1. A method of harvesting for broom corn and the like having straw heads and a boot leaf, the straws of said heads growing from a knuckle comprising severing successive stalks at points generally below the heads of such stalks; moving the severed stalk portions away and reversing the direction of said severed stalk portions so that the terminal ends of said heads point downwardly; aligning the terminal ends of said heads along a generally common line while said heads remain pointed downwardly; moving a plurality of teeth along a generally common line to engage said downwardly pointed heads at said straws; pulling said heads in a direction generally transverse to the direction of movement of said teeth to move said heads onto said teeth and toward the knuckle; severing said stalk portions adjacent each head so as also to cut through said boot leaf; and removing the portion of said boot leaf remaining on a head.

2. A method of harvesting broom corn and the like having heads, which comprises severing successive stalks at points generally below the heads of such stalks; moving the severed stalk portions away and reversing the direction of said severed stalk portions so that the terminal ends of said heads point downwardly; and severing said stalk portions at a point adjacent said heads while said heads remain pointed generally downwardly.

3. A method of harvesting broom corn and the like having straw heads and a boot leaf, the straws of said heads growing from a knuckle comprising severing successive stalks at points generally below the heads of such stalks; moving the severed stalk portions away and reversing the direction of said severed stalk portions so that the terminal ends of said heads point downwardly; aligning the terminal ends of said heads along a generally common line while said heads remain pointed downwardly; aligning said heads at the knuckles; and severing said stalk portions adjacent each head so as also to cut through said boot leaf.

4. In a method of harvesting broom corn and the like; severing successive stalks at points generally below the heads of such stalks; moving the severed stalk portions away and reversing the direction of said severed stalk portions so that the terminal ends of said heads point downwardly; aligning said heads at the knuckles from which the straws grow while said heads remain pointed downwardly; and severing the said stalk portions at a point adjacent said heads while said heads remain pointed generally downwardly.

5. In a method of harvesting broom corn and the like, severing in upright position stalks at points generally below the heads of such stalks; reversing the direction of said severed stalk portions so that the terminal ends of said heads point downwardly; aligning said heads at the knuckles from which the straws of said heads grow and moving said heads along a generally common line while said heads remain pointed generally downwardly; severing said stalk portions above said line; and brushing said severed stalk portions in a direction generally transverse to said line of movement for removing boot leaf portions subsequent to the severing.

6. In a method of harvesting broom corn and the like having straw heads and a boot leaf, the straws of said heads growing from a knuckle, severing successive stalks at points generally below the heads of such stalks; moving the severed stalk portions away and reversing the direction of said severed stalk portions so that the terminal ends of said heads point downwardly; aligning the terminal ends of said heads along a generally common line while said heads remain pointed downwardly; moving a plurality of teeth along a generally common line to engage said downwardly pointed heads at said straws; pulling said heads in a direction generally transverse to the direction of movement of said teeth to move said heads onto said teeth and toward the knuckle; and severing said stalk portions adjacent each head so as also to cut through said boot leaf.

References Cited in the file of this patent

UNITED STATES PATENTS

| | | |
|---|---|---|
| 658,527 | Lamboy | Sept. 25, 1900 |
| 1,064,617 | Cory | June 10, 1913 |
| 1,077,863 | Thomas | Nov. 4, 1913 |
| 1,134,206 | King | Apr. 6, 1915 |
| 1,149,281 | Pallady | Aug. 10, 1915 |
| 1,615,981 | James | Feb. 1, 1927 |
| 1,648,749 | Udstad et al. | Nov. 9, 1927 |
| 1,719,175 | Finn | July 2, 1929 |
| 1,823,387 | Campbell | Sept. 15, 1931 |
| 1,938,264 | Templeton | Dec. 5, 1933 |
| 1,999,638 | Richards | Apr. 30, 1935 |
| 2,197,225 | Pierson | Apr. 16, 1940 |
| 2,281,904 | Wurtele | May 5, 1942 |
| 2,291,093 | Hurst et al. | July 28, 1942 |
| 2,477,068 | Motte | July 26, 1949 |
| 2,535,884 | Woods | Dec. 26, 1950 |
| 2,564,614 | Sowers | Aug. 14, 1951 |
| 2,599,143 | Thompson | June 3, 1952 |